(12) United States Patent
Strutt

(10) Patent No.: US 7,412,241 B2
(45) Date of Patent: Aug. 12, 2008

(54) METHOD TO PROVIDE A MEASURE OF LINK RELIABILITY TO A ROUTING PROTOCOL IN AN AD HOC WIRELESS NETWORK

(75) Inventor: Guénaël T. Strutt, Sanford, FL (US)

(73) Assignee: MeshNetworks, Inc., Maitland, FL (US)

( * ) Notice: Subject to any disclaimer, the term of this patent is extended or adjusted under 35 U.S.C. 154(b) by 908 days.

(21) Appl. No.: 10/863,069

(22) Filed: Jun. 7, 2004

(65) Prior Publication Data

US 2004/0260808 A1 Dec. 23, 2004

Related U.S. Application Data

(60) Provisional application No. 60/476,237, filed on Jun. 6, 2003, provisional application No. 60/546,940, filed on Feb. 24, 2004, provisional application No. 60/546,941, filed on Feb. 24, 2004.

(51) Int. Cl.
*H04Q 7/20* (2006.01)
(52) U.S. Cl. .................... 455/445; 455/452.1; 455/453; 370/328; 370/329; 370/400
(58) Field of Classification Search .................. 370/328, 370/329, 400, 331, 235.1, 252, 338, 230; 455/428, 452.1, 453, 41.2, 445
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |

(Continued)

FOREIGN PATENT DOCUMENTS

CA 2132180 3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Joseph Feild
*Assistant Examiner*—Huy D Nguyen
(74) *Attorney, Agent, or Firm*—Randi L. Karpinia; Joseph J. Buczynski

(57) ABSTRACT

A system and method for locating optimal routes between source and destination nodes in a communications network, in particular, a wireless ad-hoc communications network by employing a link reliability algorithm that estimates the reliability of links between nodes using a prediction mechanism and a variable-weight filter. The prediction can be based on signal strength, signal-to-noise ratio or any statistic collected at the physical layer that is deemed representative of the quality of a link, and the weighting filter adjusts the predicted value based on the traffic conditions (e.g., idle, light traffic, moderate traffic or heavy traffic) being experienced by the nodes whose link quality is being estimated.

12 Claims, 5 Drawing Sheets

U.S. PATENT DOCUMENTS

| | | |
|---|---|---|
| 5,034,961 A | 7/1991 | Adams |
| 5,068,916 A | 11/1991 | Harrison et al. |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |
| 5,392,450 A | 2/1995 | Nossen |
| 5,412,654 A | 5/1995 | Perkins |
| 5,424,747 A | 6/1995 | Chazelas |
| 5,502,722 A | 3/1996 | Fulghum |
| 5,517,491 A | 5/1996 | Nanni et al. |
| 5,555,425 A | 9/1996 | Zeller et al. |
| 5,555,540 A | 9/1996 | Radke |
| 5,572,528 A | 11/1996 | Shuen |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayor et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | van Bokhorst et al. |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seazholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahany et al. |
| 6,366,568 B1 | 4/2002 | Bolgiano et al. |
| 6,405,049 B2 | 6/2002 | Herrod et al. |
| 6,609,002 B1 * | 8/2003 | Krishnamurthy et al. ..... 455/428 |
| 6,721,290 B1 * | 4/2004 | Kondylis et al. ............. 370/329 |
| 7,002,918 B1 * | 2/2006 | Prieto et al. .................. 370/252 |
| 7,200,149 B1 * | 4/2007 | Hasty, Jr. ..................... 370/400 |
| 2001/0053699 A1 | 12/2001 | McCrady et al. |
| 2002/0013856 A1 | 1/2002 | Garcia-Luna-Aceves |
| 2002/0101822 A1 | 8/2002 | Ayyagari et al. |
| 2002/0191573 A1 * | 12/2002 | Whitehill et al. ............. 370/338 |
| 2003/0142647 A1 * | 7/2003 | Agrawal et al. .............. 370/331 |
| 2003/0161268 A1 | 8/2003 | Larsson et al. |
| 2003/0202469 A1 * | 10/2003 | Cain ........................... 370/230 |
| 2003/0212821 A1 * | 11/2003 | Gillies et al. ................. 709/238 |
| 2003/0229613 A1 * | 12/2003 | Zargham et al. ............... 707/1 |
| 2004/0032847 A1 | 2/2004 | Cain |
| 2004/0109428 A1 * | 6/2004 | Krishnamurthy ............. 370/338 |
| 2004/0203820 A1 * | 10/2004 | Billhartz .................. 455/452.1 |
| 2004/0208127 A1 * | 10/2004 | Rodriguez et al. ........ 370/235.1 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

Chip Elliott and Bob Heile, "Self-Organizing, Self-Healing Wireless Networks," 2000 IEEE.

J.J. Garcia-Luna-Aceves and Ewerton L. Madruga, "The Core-Assisted Mesh Protocol," Aug. 1999, IEEE Journal on Selected Areas in Communications, vol. 17, No. 8.

* cited by examiner

METHOD TO PROVIDE A MEASURE OF LINK RELIABILITY TO A ROUTING PROTOCOL IN AN AD HOC WIRELESS NETWORK

This application claims benefit under 35 U.S.C. § 119(e) from U.S. Provisional Patent Application of Avinash Joshi entitled "System and Method to Improve the Network Performance of a Wireless Communication Network by Finding an Optimal Route Between a Source and a Destination", Ser. No. 60/476,237, filed on Jun. 6, 2003, in a U.S. Provisional Patent Application of Guenael T. Strutt entitled "A System and Method for Providing a Measure of Link Reliability to a Routing Protocol in an Ad Hoc Wireless Network, Ser. No. 60/546,940, filed on Feb. 24, 2004, and from U.S. Provisional Patent Application of Avinash Joshi and Guenael T. Strutt entitled "System and Method for Characterizing the Quality of a Link in a Wireless Network", Ser. No. 60/546,941, filed on Feb. 24, 2004, the entire contents of both documents being incorporated herein by reference.

BACKGROUND OF THE INVENTION

1. Field of the Invention

The present invention relates to an improved system and method for locating optimal routes between source and destination nodes in a communications network, in particular, a wireless ad-hoc communications network. More particularly, the present invention relates to a system and method for identifying optimal routes between source and destination nodes in a communications network by estimating the a posteriori packet completion rate.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at a first node to communicate simultaneously with several other nodes in its coverage area.

In recent years, a type of mobile communications network known as an "ad-hoc" network has been developed. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", granted on Jul. 4, 2006, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, now U.S. Pat. No. 6,807,165, and in U.S. patent application Ser. No. 09/815,164 entitled "Prioritized-Routing for an Ad-Hoc, Peer-to-Peer, Mobile Radio Access System", filed on Mar. 22, 2001, now U.S. Pat. No. 6,873,839, the entire content of each being incorporated herein by reference.

As can be appreciated by one skilled in the art, since certain nodes of the ad-hoc network are mobile, it is necessary for the network to maintain connectivity with those nodes. Transmitted data packets typically "hop" from mobile device to mobile device, creating a transmission path, or route, until reaching a final destination. However, transmission paths between mobile devices are often subject to change as devices move, therefore ad-hoc network communication must be able to adapt to achieve optimum performance while addressing the limited capabilities and capacities of mobile individual devices.

In a typical wireless communication network, the number of hops between the source and the destination is used as the routing metric, with the route having a lesser number of hops typically being a more preferred route. However, this can lead to selection of un-optimal routes, as there can be a better route with a greater number of hops but better link quality or data rate.

Examples of types of routing protocols are described in U.S. Pat. No. 5,412,654, and in U.S. Provisional Patent Application Ser. No. 60/476,237 referenced above, the entire contents of both documents being incorporated herein by reference. In these techniques, each node calculates a route metric to its destination, possibly using alternate routes. The aim is to select the best route by selecting the route with the lowest metric.

As described in U.S. Pat. No. 5,412,654, the metric is simply the number of hops. However, as described in U.S. Provisional Patent Application Ser. No. 60/476,237, the metric is a more elaborate value and relies on a "link reliability" calculation that is based on signal strength. The "link reliability" is a more refined component of a routing metric because, instead of adding "1" for each hop, the algorithm adds an integer value which is larger (e.g., 20) if the link cannot be used to its fullest potential. Thus, each node assigns an integer value which is minimal (e.g., 1) for the best radio links and larger (e.g., 20) if the radio link is degraded due to, for example, multipath, fading, congestion, distance, shadowing, interference, and so on. Other examples of techniques for determining link quality are set forth in published U.S. Patent Application No. 2004/0022223 and in U.S. Pat. No. 6,522,881, the entire contents of both being incorporated herein by reference.

Although the technique described in the provisional patent application referenced above is suitable for many radio networks, including wireless ad-hoc peer-to-peer networks, certain drawbacks of the technique may become apparent when used in a network comprising mainly low-cost wideband radios. For example, sporadic traffic errors such as those encountered in a normal radio channel (such as static multipath) do not usually cause the link reliability to be adjusted, since signal strength and signal-to-noise ratio are unaffected. Also, in the particular case of a fading channel, the low-cost wideband radio is not able to properly track the variations in signal strength that are encountered at the receiver's end. This is partly due to the fact that the measurement depends on the sensitivity of the radio, and partly due to the fact that the receiver can only make sporadic measurements (such as one particular point in time when the packet is received), which provides partial information about actual signal strength variations.

Accordingly, a need exists for an improved system and method for discovering optimal routes between source and destination nodes in a communications network in an efficient way using factors other than the number of hops or received signal strength as the sole metrics.

SUMMARY OF THE INVENTION

An object of the present invention is to provide an improved system and method for locating optimal routes between source and destination nodes in a communications network, in particular, a wireless ad-hoc communications network.

Another object of the present invention is to provide an improved system and method for identifying optimal routes between source and destination nodes in a communications network using factors other than the number of hops between the nodes or power control as the only metrics on which the optimal route selection is based.

These and other objects are substantially achieved by a system and method for locating optimal routes between source and destination nodes in a communications network, in particular, a wireless ad-hoc communications network by employing a link reliability algorithm that estimates the reliability of links between nodes using a prediction mechanism and a variable-weight filter. The prediction can be based on signal strength, signal-to-noise ratio or any statistic collected at the physical layer that is deemed representative of the quality of a link, and the weighting filter adjusts the predicted value based on the traffic conditions (e.g., idle, light traffic, moderate or heavy traffic) being experienced by the nodes whose link qualities are being estimated.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
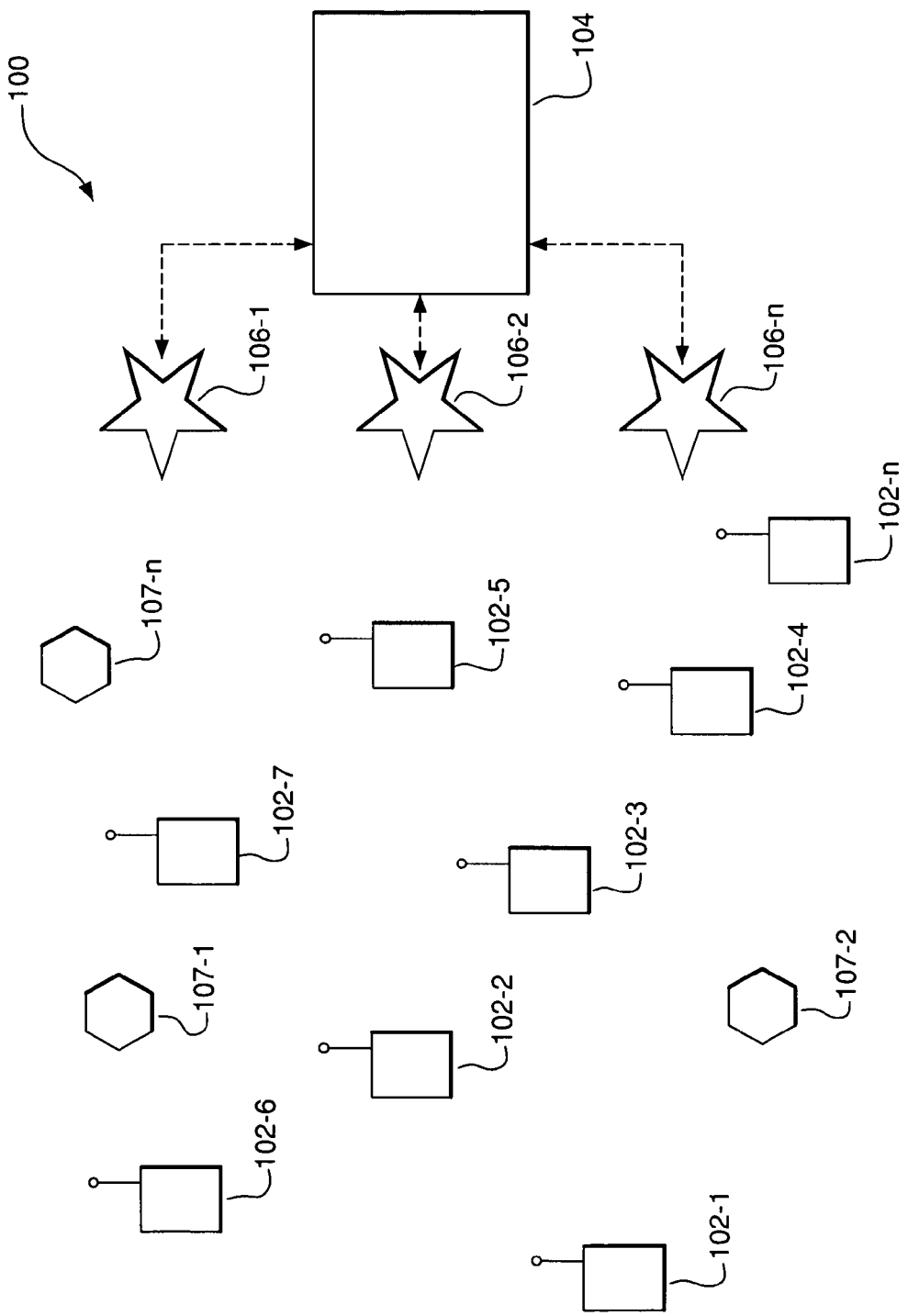
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. Pat. No. 7,072,650, Ser. No. 09/815,157 and U.S. Pat. No. 6,873,839, referenced above.

Figure 2:
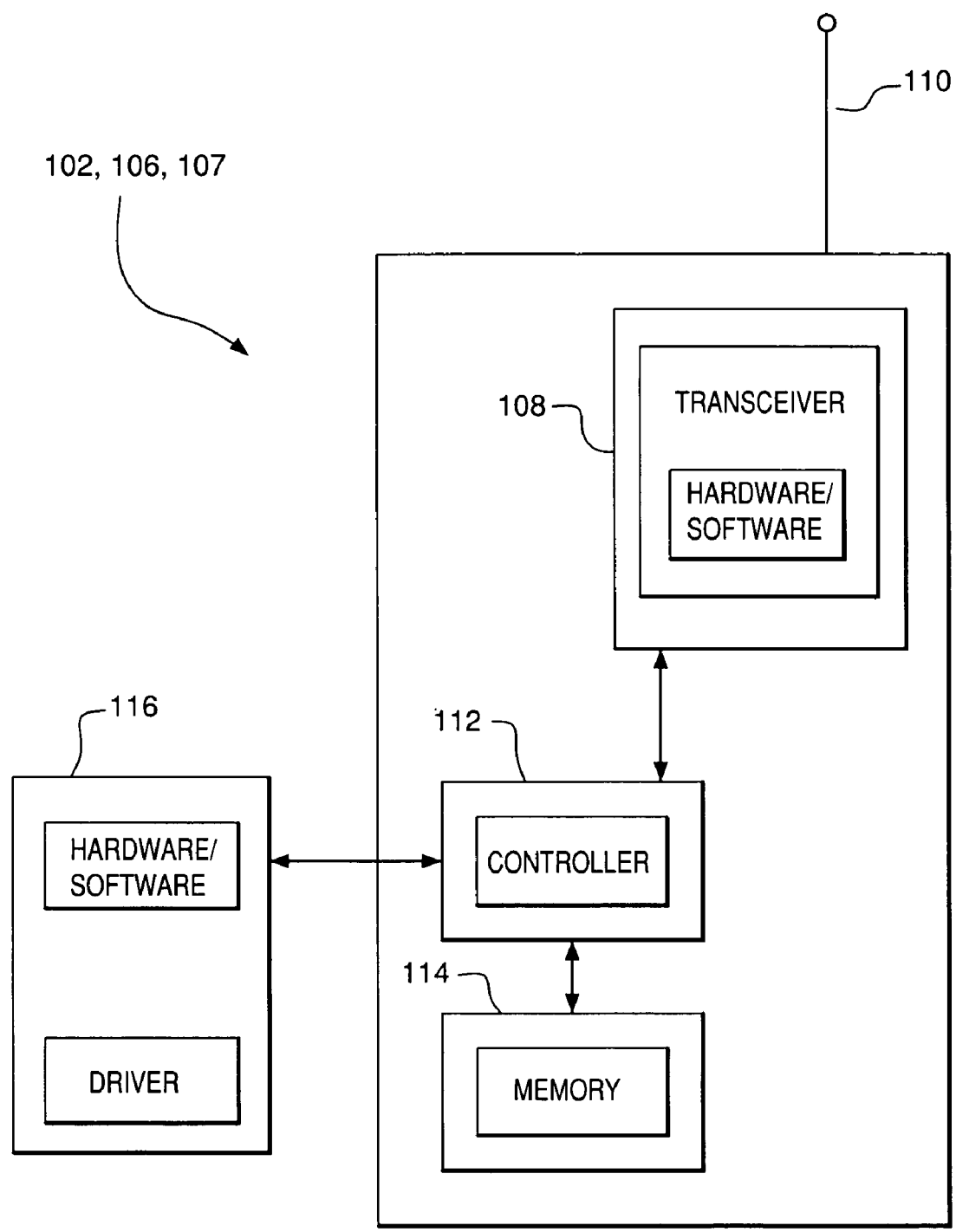
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

As discussed in the Background section above, in order to optimize network performance, techniques have been developed which enable nodes to select optimum links via which to send data packets between each other. Such techniques may estimate link reliability based on signal strength. Unfortunately, as discussed above, signal strength does not necessarily provide an accurate measure of link reliability. The technique according to an embodiment of the present invention as described below is more universal than previous techniques, and can be applied to virtually any radio technology (i.e., it is "radio agnostic"). This ability is advantageous and important because link reliability determines the best metric used for the routing protocol, which may be required to operate on multiple radio technologies, possibly at the same time.

As can be appreciated by one skilled in the art, the link reliability to a neighboring node is a measure of the probability of a packet being successfully received by the neighboring node. The link reliability can be predicted by using, for example, the received signal strength or the signal-to-noise ratio of received data packets. This is especially useful if there is no active communication to the neighbor. The link reliability can also be measured by using MAC information. However, typically this can be accomplished with a reasonable degree of accuracy only if there is an active communication link to the neighbor.

The components of the link reliability estimation algorithm according to an embodiment of the present invention include a prediction mechanism and a variable-weight filter. The prediction can be based on signal strength, signal-to-noise ratio or any statistic collected at the physical layer that is deemed representative of the quality of a link. The prediction needs to be performed when there is no established link to a particular node and when it is possible to receive information about that node. This can be accomplished either through passive listening of packets directed to other nodes, or active reception of special advertisement/awareness packets, such as the "hello" messages that are sent on the reservation channel as described in U.S. Provisional Patent Application Ser. No. 60/476,237 referenced above.

The object of the current invention is to measure the a posteriori packet completion rate by using a variable weight filter. Since packets are received and transmitted at non-regular intervals, in order to perform proper filtering, it is necessary to adjust the forgetting factor to the actual time-step (fixed-weight filter implementations assume a constant time-step). Otherwise, the system would converge too fast in high traffic conditions and too slow in moderate traffic conditions. This novel approach normalizes the convergence rate of the link reliability calculation mechanism vis-à-vis time, i.e., it is independent of the type and amount of traffic the transceiver is sending, which is unpredictable and chaotic by nature (the transceiver has no knowledge of the application that it is used for). Specifically, the determination of the packet completion rate is to some extent independent of the time interval. Although it may be easier to look at the past "x" amount of packets and count the number that were successful and the number that failed and derive the completion rate from those numbers, this method is inefficient because it requires a memory of all of the past "x" number of transactions. The method is also inaccurate from a time standpoint because it would not be aware of whether the last "x" transactions occurred within the last hour or last millisecond. The present invention therefore addresses these two issues: computational efficiency and quasi independence vis-à-vis time.

The link reliability computation is performed according to Equation 1 as follows:

$$LR(t_0) = (1 - \lambda^{\Delta t/\Delta T}) \cdot X(t_0) + \lambda^{\Delta t/\Delta T} \cdot LR(t_{-1})$$

Equation 1—Link Reliability estimation $LR(t_0)$ is the current link reliability
$LR(L_{-1})$ is the previous link reliability
$\lambda^{\Delta t/\Delta T}$ is the current forgetting factor
$\Delta t = t_0 - t_{-1}$ is the current inter-arrival time
$\Delta T$ is the reference time unit
$X(t_0)$ is the current filter input (based on prediction).

Figure 5A:
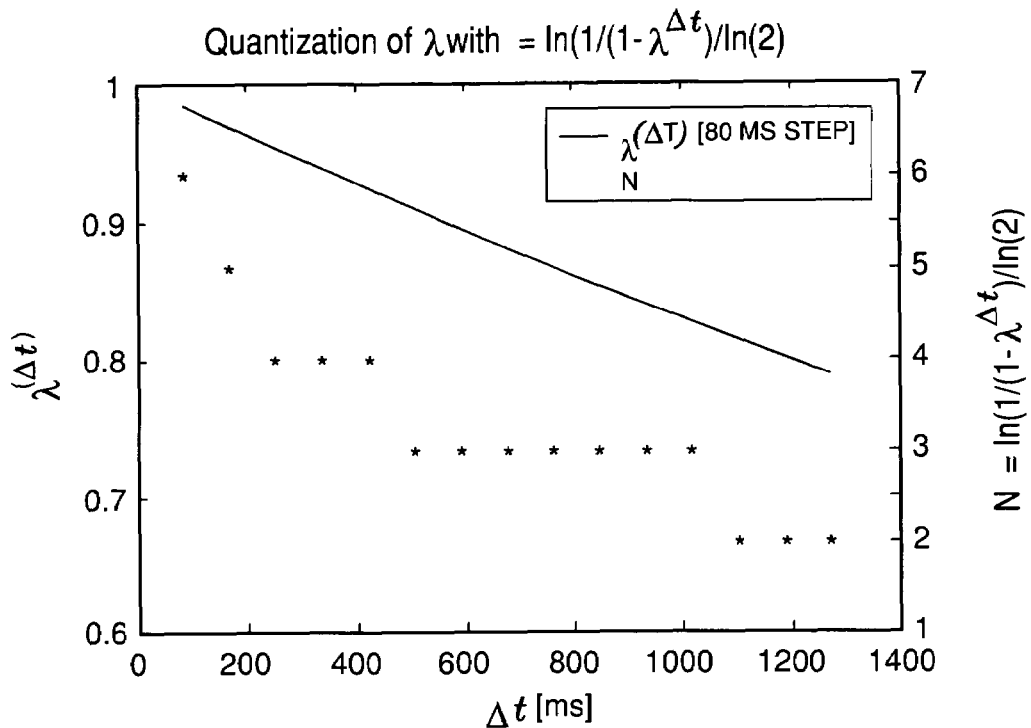
FIG. 5(a) is a graph illustrating a set of quantized $\Lambda$ for various inter-arrival times $\Delta t$.
Figure 5B:
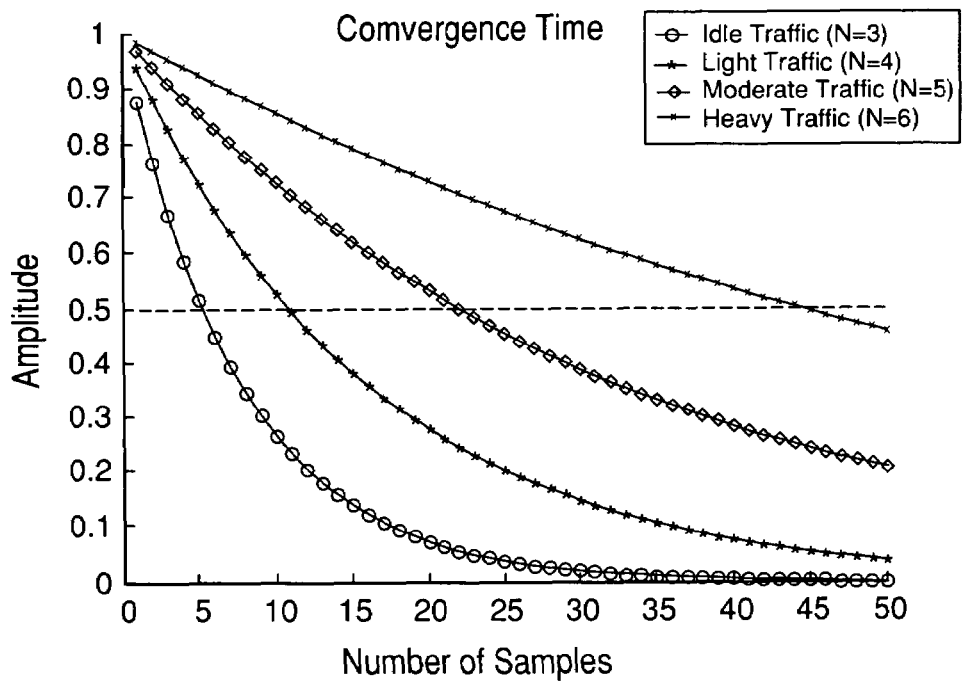
FIG. 5(b) is a graph illustrating the response of the variable weight filter to control channel (idle), light traffic, moderate traffic and heavy traffic operating conditions of a node in the system shown in FIG. 1.

The output of the filter that is described in Equation 1 will converge towards the average of the inputs ($X(t_0)$). Therefore, if the input of the filter is the value 0 for each failed transmission and 1 for each successful transmission, the output of the filter, after a certain number of iterations, will converge towards the ratio of the number of successfully transmitted packets and the number of transmitted packets. This ratio is by definition the packet completion rate For programming convenience, the forgetting factor can be quantized into a finite number of values such as those presented in FIGS. 5(a) and 5(b) discussed below, thus making a fixed-point implementation possible in a microprocessor. It is further noted that $X(t_0)$ is the prediction, and $LR(t_0)$ is the value that is used at time to by the routing algorithm to verify the reliability of a link. As conditions change, the packet completion rate for a particular link might change, and the routing algorithm's information about this particular link will be adjusted accordingly. The "previous link reliability" value is the value that was computed at the previous iteration of the algorithm. At startup (i.e. when a new link is established) it is necessary to introduce an initial value for the algorithm. For conservative estimations, this initial value can be 0 (i.e., a 0% packet completion rate). For more proactive results, this initial value can be set 50%. The initialization value has no influence on the convergence of the algorithm whatsoever. It must be selected based on the way the routing algorithm interprets the link reliability. It is judicious to select an initial value that does not force the routing algorithm to abandon another established link because it has gathered sufficient information about the new link that has been initialized. For each iteration subsequent to initialization, the "previous link reliability" is the output (the "current link reliability") of the previous iteration.

It is further noted that the network architect should determine the equation for "predicted value" based on certain radio characteristics such as sensitivity for various data rates, mobility performance, and so on. The equation used for the prediction in MeshNetworks' Mea™ system is twofold: there is a conservative prediction for idle operation and a proactive prediction for active communication links. Assuming that the links are symmetrical from a transmit power point of view, both predictions are based on the received signal strengths of packets. If the links are asymmetrical from a transmit power point of view, it is important to ensure that the "received signal strength" that is used is the one that is measured by the receiver.

The following equations represent examples of those for prediction values:

Equation 2-Conservative prediction for "hello" messages $$\begin{cases} LR = 0; & SS_{dBm} < -99 \\ LR = SS_{dBm} \times 5 + 495.2; & -99 \leq SS_{dBm} < -85 \\ LR = SS_{dBm} \times 0.667 + 126.8; & -85 \leq SS_{dBm} < -40 \\ LR = 100; & -40 \leq SS_{dBm} \end{cases}$$

Equation 3-Proactive prediction for data packets $$\begin{cases} LR = SS_{dBm} \times 4 + 426; & SS_{dBm} < -83 \\ LR = SS_{dBm} \times 0.232 + 109.5; & -83 \leq SS_{dBm} < -40 \\ LR = 100; & -40 \leq SS_{dBm} \end{cases}$$

Figure 3:
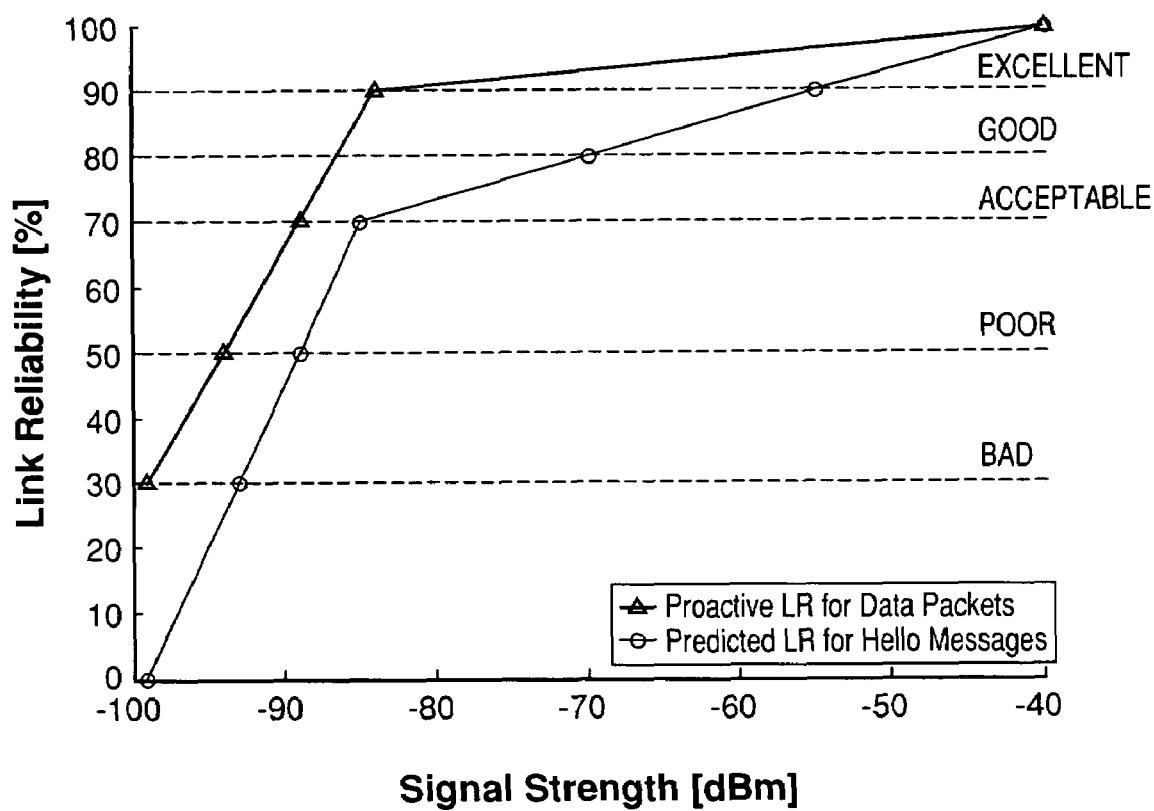
FIG. 3 is a graph representing predicted link reliability versus signal strength for data packets and hello messages.

FIG. 3 is a graphical representation of equations 2 and 3. It is noted that the "proactive prediction" mechanism is completely optional. If there is traffic being sent, the algorithm will still maintain connectivity based on the reliability of each link. The added benefit of converting the signal strength into a proactive prediction value is that the algorithm will apply a minor penalty to links that are at a longer range. If there is a mechanism to apply such a penalty already (such as an energy-aware routing algorithm), the link reliability prediction in equation 1 should be set at LR=100 for all data packets (the prediction for hello messages remains unaffected).

The variable forgetting factor is selected to accommodate various operating conditions such as the following three:

Idle operation: The unit receives only "advertisement/awareness" messages. The average inter-arrival time is typically greater than 500 ms.

Low traffic: The unit transmits a small amount of data. The average inter-arrival time is typically between 200 and 500 ms.

Moderate traffic: The unit transmits a moderate amount of data. The average inter-arrival time is typically between 100 and 200 ms.

Heavy traffic The unit transmits a large amount of data. The average inter-arrival time is typically smaller than 100 ms.

Figure 4:
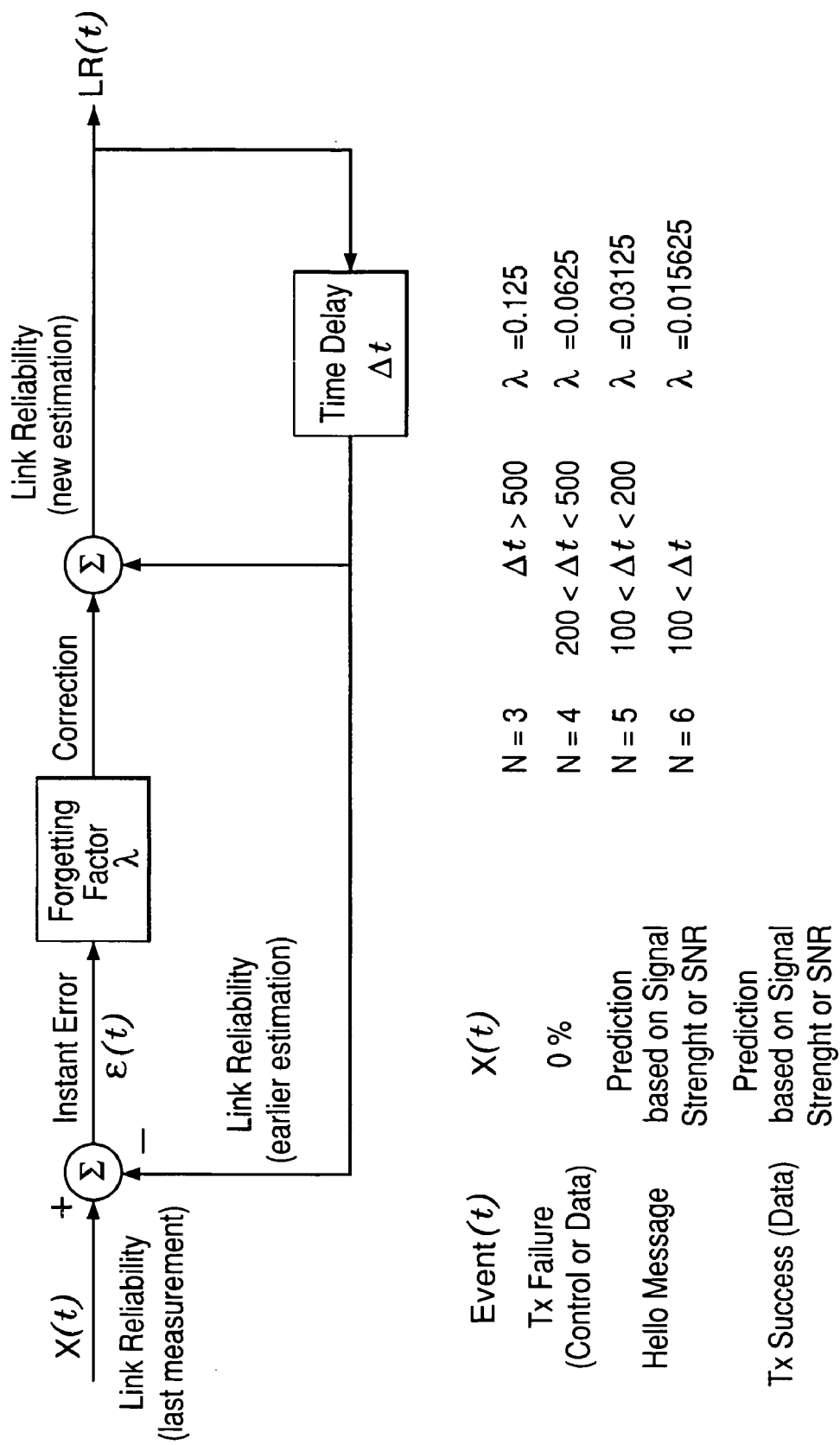
FIG. 4 is a block diagram representation of an equation for calculating link reliability according to an embodiment of the present invention.

By calculating the time between each transmission, the transceiver 108 of a node 102, 106 or 107 is able to select the forgetting factor accordingly and compute the new link reliability in accordance with Equation 1, which is represented as a block diagram in FIG. 4. Specifically, $X(t_0)$ is the input to the filter. The transceiver 108 updates its link reliability estimation to another node by assigning the value 0 to $X(t_0)$ for each failed transmission and by assigning a predictive value to $X(t_0)$ for each successful transmission or successful reception of an advertisement/awareness packet. The predictive value is platform-dependent and cannot be generalized to any physical layer implementation. The predictive value depends on physical layer parameters, such as signal strength, SNR or any other relevant statistic available, on which the performance of the radio partially depends. Thus, for a weak signal strength or SNR for which the system designer knows the radio to not operate successfully, the predictive value should be equally low (close to 0). Similarly, for a strong signal strength or SNR for which the system designer knows the radio to operate successfully, the predictive value should be set to the maximum value in the range allotted to link reliability (e.g., 100 representing 100%). A look-up table of values converting signal strength or SNR to link reliability values in the allotted range of, for example, between 0 and 100, can then be established by the system designer. This look-up table does not tell how successful the link actually is since it only uses physical layer information, but it performs a prediction that is vital to the proper operation of a mobile node in a wireless ad hoc network.

FIG. 5(*a*) shows a set of quantized $\lambda^{(\Delta t/\Delta T)}$ (where $\lambda=(2^6-1)/2^6$ and $\Delta t$ is equal to 85 ms), and FIG. 5(*b*) shows the response of the variable weight filter to the four aforementioned operating conditions (i.e., idle operation (control channel), low traffic, moderate traffic and heavy traffic). As can be appreciated from these figures, for the slower traffic loads such as the "Control Channel" traffic scenario, the convergence rate is smaller than the others (e.g., for an initial state of "1", the value reaches "0.5" after using five "0" as inputs). The algorithm tries to maintain a constant convergence time by adjusting the convergence rate for each iteration. Indeed, if the inter-arrival time between packets is large, then the convergence rate per packet must be faster. Similarly, if the inter-arrival time between packets is small, then the convergence rate per packet must be slower.

Values for $\lambda^{(\Delta t/\Delta T)}$ have been quantized for programming convenience. Once the inter-arrival time has been determined, a value gets added or subtracted to the previous link reliability value $LR(t_{-1})$: that value is $\lambda^{(\Delta t/\Delta T)} \cdot X(t_0)$. As can be appreciated by one experienced in the art, such multiplication in a fixed-point processor can be difficult to accomplish, especially since $\lambda^{(\Delta t/\Delta T)}$ is a real number greater than 0 and smaller than 1. If $\lambda^{(\Delta t/\Delta T)}$ can be expressed as the inverse of a power of 2, the multiplication become as simple right-bit-shift operation. If the power of two that corresponds to a specific $\lambda^{(\Delta t/\Delta T)}$ is N, then $$\lambda^{(\Delta t/\Delta T)} = \frac{1}{2^N} \Leftrightarrow N = \frac{\ln\left(\frac{1}{\lambda^{(\Delta t/\Delta T)}}\right)}{\ln(2)}$$

Using this example, the quantized $\lambda^{(\Delta t/\Delta T)}$ values are given in the following table:

| $\Delta t/\Delta T$ | $\Delta t$ | $\lambda^{(\Delta t/\Delta T)}$ | N | Round(N) |
|---|---|---|---|---|
| 1 | 85 ms | .9844 | 6 | 6 |
| 2 | 170 ms | .9690 | 5.01 | 5 |
| 3 | 255 ms | .9539 | 4.44 | 4 |
| 4 | 340 ms | .9389 | 4.03 | 4 |
| 5 | 425 ms | .9243 | 3.72 | 4 |
| 6 | 510 ms | .9098 | 3.47 | 3 |
| 7 | 595 ms | .8956 | 3.26 | 3 |
| 8 | 680 ms | .8816 | 3.08 | 3 |
| 9 | 765 ms | .8679 | 2.92 | 3 |

The link reliability calculation is therefore performed using N=3 in idle operation (which corresponds to a $\Delta t$ greater than 500 ms), N=4 in light traffic (which corresponds to a $\Delta t$ between 200 ms and 500 ms), N=5 in moderate traffic (which corresponds to a $\Delta t$ between 100 ms and 200 ms) and N=6 is heavy traffic (which corresponds to a $\Delta t$ smaller than 100 ms).

The following section is an explanation of how the predictive model combined with a variable-weight filter enables a mobile node (e.g., node 102) to establish optimal routes in a wireless ad hoc network 100.

Link reliability estimation is critical in the following scenarios: first, when a link is established, and second, when a link is broken. These events may occur in the following conditions: first, while remaining within a particular neighborhood and secondly, while leaving a neighborhood. The possible cases are summarized in Table 1 below:

TABLE 1

Case scenarios

| | | Route transition | |
|---|---|---|---|
| | | Establish new route | Break current route |
| Type of motion | Inter-neighborhood | Neighborhood entry | Neighborhood exit |
| | Intra-neighborhood | Link adjustment | Link memory |

Each case scenario is described in more detail in the following sections.

Neighborhood entry:

Description A transceiver enters within the range of another unit, that is, when a mobile node 102, for example, enters the range of another node 102, 106 or 107.

Objective: The link reliability estimation algorithm must be able to quickly indicate which links are more favorable than the one currently used.

Mechanism: When processing advertisement/awareness packets, the link reliability estimation algorithm makes a prediction using the signal strength or SNR of the received packet only.

Neighborhood exit:
Description A transceiver becomes out of range.
Objective: The link reliability estimation algorithm must be able to predict that the link is going to be dropped before the failure takes place. This feature is part of a more general mechanism referred to as "make-before-break".
Mechanism: The link reliability estimation algorithm makes a prediction using the signal strength of the packet, and degrades the link reliability value accordingly. This degradation is made in addition to the one caused by failed packet transmissions. Thus, it voluntarily underestimates the reliability of the link in order to give precedence to other available links with more favorable predictions.
Link adjustment:
Description: Although the destination is well within range, the packet completion rate drops. This may be caused by fading, the temporary inability to perform monitoring or the presence of interference.
Objective: The link reliability estimation algorithm must be able to adjust rapidly to actual channel conditions, such as interference and shadowing. This is the mechanism by which the link reliability estimation algorithm informs the routing protocol of a failure.
Mechanism: The link reliability estimation algorithm adjusts the link reliability to match the packet completion rate to each destination in real time.
Link failure memory:
Description: Although the link has been severed, the node is still within range.
Objective: The algorithm must retain a memory of the link failure to avoid routing instabilities.
Mechanism: When processing advertisement/awareness packets, the link reliability estimation algorithm makes a prediction using the signal strength or SNR of the packet, thus driving the link reliability value upward. The time it takes for reliability to go from a failure to a reestablishment of a route (the memory failure time) must be significantly larger than the time it took to establish a route to this node the first time (memory-less failure time).

As can be appreciated from the above, the system and method presented herein calculates an integer value (the "link reliability") in order for the routing protocol to select the best route to its destination. This technique can also be used for more advanced features such as data rate selection, channel selection or even packet fragmentation/concatenation. Furthermore, link reliability can be determined using the aforementioned system and method independently for each carrier frequency, for each packet size interval, for each data rate or for each modulation type the system operates with, or for any combination of those. Thus, the system and method can determine which optimal channel, fragmentation/concatenation method, data rate or modulation type it must use at any given time by selecting the one which provides the best link reliability.

As can further be appreciated from the above, the technique according to the embodiment of the present invention is advantageous over the techniques described in the Background section for several reasons. First, the technique is unit-testable, meaning that it is easy to verify that the algorithm has been properly implemented. SNR and signal-strength-based methods cannot be expected to tell exactly how reliable links are, but rather, they can only estimate the reliability. The technique is also programmable and can be implemented in a microprocessor, and it is synthesizable and thus can be implemented in an ASIC or FPGA. The technique is also portable in that it can be used for any type of packet radio, regardless of the bandwidth or the fading characteristics of the band in which the radio operates. One of the features of the algorithm is that the traffic need not be constant or regulated. Furthermore, the technique is adaptive and thus can be adjusted for any degree of traffic load or convergence times, and filter parameters and inter-arrival time boundaries can be adjusted externally. In addition, the technique is simple to implement and development costs are minimal.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method for locating optimal routes between source and destination nodes in an ad-hoc multi-hopping peer-to-peer wireless communications network, the method comprising:
estimating reliability of links between nodes in the network using a prediction mechanism and a variable-weight filter to identify an optimal route including some of the nodes between the source and destination nodes, such that the variable-weight filter adjusts a predicted value based on the traffic conditions being experienced by the nodes whose link qualities are being estimated; and
selecting a route between the source and destination nodes comprising the nodes having the most preferable link qualities as determined in the estimating step,
wherein the estimating step estimates link reliability based on the following equation:

$$LR(t_0) = (1 - \lambda^{\Delta t/\Delta T}) \cdot X(t_0) + \lambda^{\Delta t/\Delta T} \cdot LR(t_{-1})$$

where
$LR(t_0)$ is the current link reliability
$LR(t_{-1})$ is the previous link reliability
$\lambda^{\Delta t/\Delta T}$ is the current forgetting factor
$\Delta t = t_0 - t_{-1}$ is the current inter-arrival time
$\Delta T$ is the reference time unit
$X(t_0)$ is the current filter input (based on prediction).

2. A method as claimed in claim 1, wherein:
the predicted value is based on at least one of signal strength and signal-to-noise ratio.

3. A method as claimed in claim 1, wherein:
the traffic conditions include idle, light traffic, moderate traffic or heavy traffic.

4. A method as claimed in claim 1, wherein:
the source and destination nodes are mobile nodes.

5. A method as claimed in claim 1, wherein:
the most preferable link qualities include a measure of probability of a packet being successfully received by the destination node.

6. A method as claimed in claim 1, wherein the traffic conditions being experienced are determined by calculating the inter-arrival time between each packet transmission.

7. A node adapted to locate optimal routes between itself and a destination node in an ad-hoc multi-hopping peer-to-peer wireless communications network, the node comprising:
a controller, adapted to estimate reliability of links between nodes in the network using a prediction mechanism and a variable-weight filter to identify an optimal route including some of the nodes between the source and destination nodes, such that the variable-weight filter adjusts the predicted value based on the traffic conditions being experienced by the nodes whose link qualities are being estimated, and further adapted to select a route between the source and destination nodes comprising the nodes having the most preferable link qualities as determined in the estimating step,
wherein the controller estimates link reliability based on the following equation:

$$LR(t_0)=(1-\lambda^{\Delta t/\Delta T})\cdot X(t_0)+\lambda^{\Delta t/\Delta T}\cdot LR(t_{-1})$$

where
$LR(t_0)$ is the current link reliability
$LR(t_{-1})$ is the previous link reliability
$\lambda^{\Delta t/\Delta T}$ is the current forgetting factor
$\Delta t = t_0 - t_{-1}$ is the current inter-arrival time
$\Delta T$ is the reference time unit
$X(t_0)$ is the current filter input (based on prediction).

8. A node as claimed in claim 7, wherein:
the predicted value is based on at least one of signal strength and signal-to-noise ratio.

9. A node as claimed in claim 7, wherein:
the traffic conditions include idle, light traffic, moderate traffic or heavy traffic.

10. A node as claimed in claim 7, wherein:
the source and destination nodes are mobile nodes.

11. A node as claimed in claim 7, wherein:
the most preferable link qualities include a measure of probability of a packet being successfully received by the destination node.

12. A node as claimed in claim 7, wherein the traffic conditions being experienced are determined by calculating the inter-arrival time between each packet transmission.

* * * * *